Aug. 14, 1962
B. M. CAIN
3,049,633
LIQUID-COOLED ROTOR FOR DYNAMOELECTRIC MACHINE
Filed Aug. 22, 1960
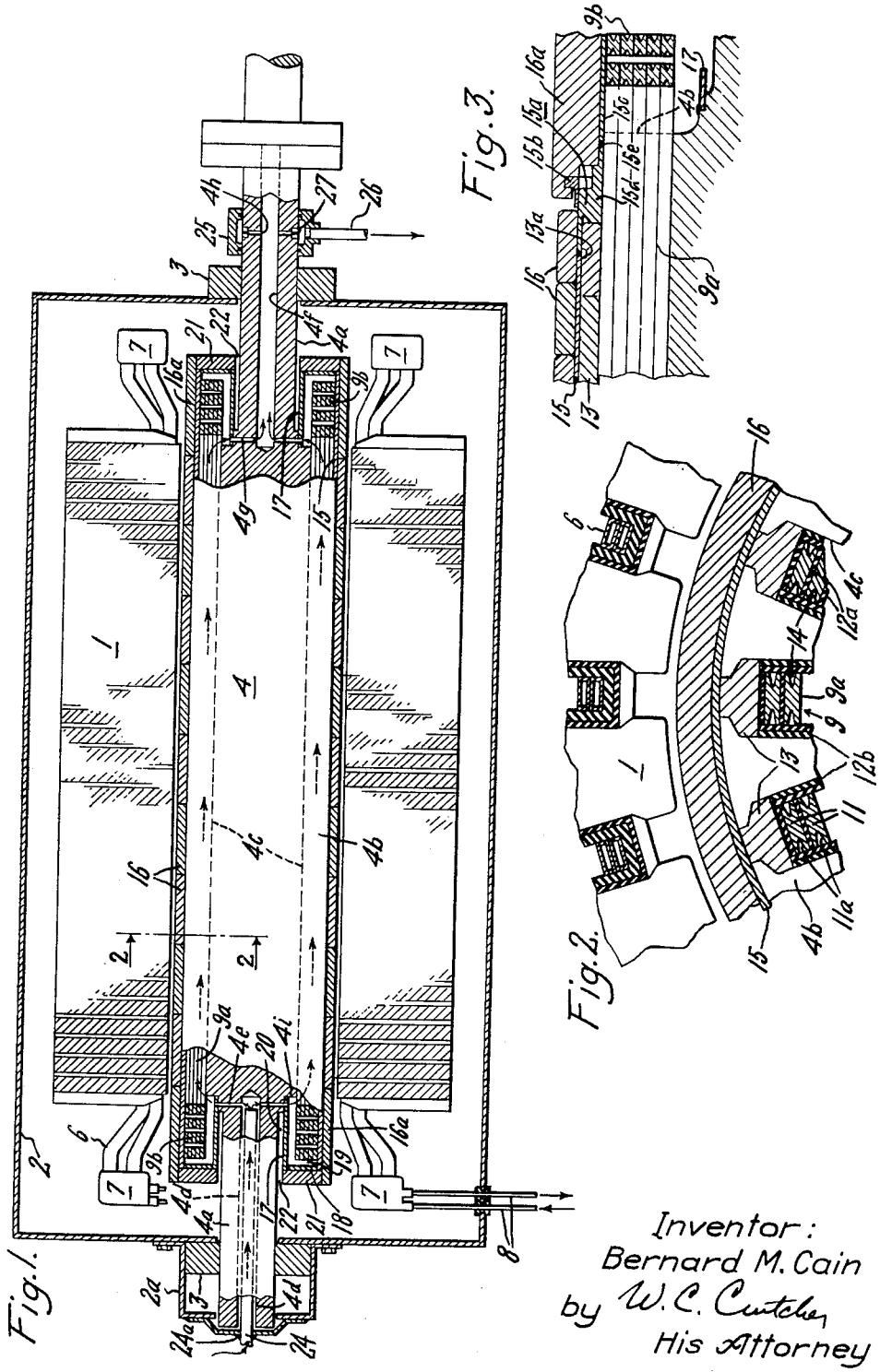
Inventor:
Bernard M. Cain
by W. C. Cutcher
His Attorney

United States Patent Office 3,049,633
Patented Aug. 14, 1962

3,049,633
LIQUID-COOLED ROTOR FOR DYNAMO-
ELECTRIC MACHINE
Bernard M. Cain, Schenectady, N.Y., assignor to General
Electric Company, a corporation of New York
Filed Aug. 22, 1960, Ser. No. 51,182
6 Claims. (Cl. 310—54)

This application is a continuation-in-part of my earlier filed application, now abandoned Serial No. 834,460, filed August 18, 1959, and assigned to the same assignee as the present invention.

This invention relates to an improved construction for dynamoelectric machine rotors having direct-cooled windings and more particularly it relates to a rotor construction having both the end turns and the slot portions of the windings bathed by a cooling liquid where the rotor is intended to operate at high speed.

One of the factors for determining the capacity of a large dynamoelectric machine, such as a turbine generator, is the number of ampere-turns which can be supplied to the rotating field windings. But increasing the current supplied to the field winding on a generator rotor to increase the effective ampere-turns also increases the amount of heat generated due to the $I^2R$ loss in the windings; and in order to hold the temperature to reasonable levels, cooling of the rotor is desirable.

Although gaseous coolants are generally employed to cool the windings in present day generator rotors, liquid coolants have been examined for some time as to their feasibility for cooling a generator rotor, due to the higher heat transfer coefficients and due to the higher capability per unit volume for absorbing and carrying away heat from the rotor. Various constructions have been suggested for circulating liquid coolant through longitudinal slots or holes cut in the rotor body where the rotor body itself provides the necessary strength to sustain the centrifugal force exerted by the liquid. An example of this type of construction may be seen in U.S. Patent No. 2,618,756, issued November 18, 1952, to C. J. Fechheimer. Such constructions depend upon the liquid cooling the rotor body itself which has received the heat from the windings by conduction.

One of the most difficult problems immediately encountered in designing a rotor to operate with liquid coolant is the effect of centrifugal force on the liquid. Whereas this is not a serious problem with gaseous coolants, rotor speeds in the neighborhood of 3600 r.p.m. cause the pressure exerted by the relatively dense liquid on its surroundings to become very high toward the periphery of the rotor. To this end, special means must be provided both to sustain the added load due to the liquid and to prevent leakage.

Any cylindrical container for a liquid-cooled rotor must necessarily be of great thickness to contain a relatively small quantity of liquid. This is because the weight of the container itself is the primary contributor to the total imposed stress. An additional load is encountered in the vicinity of the end windings which are not held by slot wedges, and any cylindrical containing member in this region must carry the load imposed by a liquid, the end windings, and its own weight as well.

Greater efficiency in cooling the windings can be obtained if the conductor strands themselves are brought in heat exchange relationship with the coolant. Provision must also be made for cooling the end turns of the windings, which extend beyond the rotor slots at the ends of the body. Where a liquid coolant is used, it must have good dielectric qualities, since it is in contact with all of the strands, thereby being subject to possible leakage currents. In order to provide "direct cooling" of the slot portions of the windings (where a liquid is to be used), there must either be a number of individual pipes connected to supply liquid to the individual conductors, or else the windings must be completely immersed in liquid. The former approach requires very complex plumbing with numerous connections which are subject to leakage, and in addition, this approach is not very suitable for end turn cooling. The latter approach requires suitable means both to prevent leakage of the liquid and to provide the strength to retain the relatively large quantities of liquid employed. The problem of sealing against leakage is also complicated by the fact that the rotor shaft deflects due to its great weight and length.

It will be appreciated that suitable solutions for the purely mechanical problems of retaining the liquid are not always compatible with suitable electrical and magnetic requirements of a dynamoelectric machine. In fact, massive members, which will both serve to withstand the applied force and which are of a material which can be easily worked or welded together to form a liquid seal, are generally composed of magnetic material and will therefore distort the magnetic flux pattern. On the other hand, if non-magnetic high strength metal alloy materials are used, it can be stated that, as a general rule, these alloys are more difficult to machine, to weld or otherwise join together.

Accordingly, one object of the present invention is to increase the capacity of a dynamoelectric machine by providing an improved construction suitable for cooling the rotor windings with a liquid.

Another object is to prevent the leakage of liquid from a "flooded" type rotor operating at high speed.

Still another object of the invention is to provide a simplified construction for conducting the liquid through the slots to the other end of the rotor in contact with the strands without radial leakage from the slots past the wedges into the air gap.

Another object is to provide an improved construction for liquid cooling of the end turn enclosure, where the end turns are submerged in the liquid and cooled by free convection currents.

Another object is to provide a construction for a "flooded rotor" wherein the stresses in the end retaining rings are reduced.

A further object is to provide sealed rotor enclosures at the ends of the rotor which hold coolant for cooling the rotor end turns while providing sufficient flexibility for shaft deflection.

The subject matter which I regard as my invention is particularly pointed out and distinctly claimed in the concluding portion of this specification. My invention, however, both as to organization and method of practice, together with further objects and advantages thereof, may best be understood by reference to the following description taken in connection with the accompanying drawing in which:

FIG. 1 is a side elevation in section of a generator showing my improved rotor construction;

FIG. 2 is an enlarged view taken along lines 2—2 in FIG. 1; and

FIG. 3 is an enlarged horizontal section of the end windings showing a modification of the invention.

Generally stated, the invention is practiced by enclosing the rotor in a thin cylindrical member which prevents leakage of the liquid coolant. This thin cylindrical member is surrounded with a number of relatively thick non-magnetic hoops. These hoops are not leak-tight but are closely adjacent so as to withstand the force of the liquid on the cylindrical member.

Referring now to FIG. 1 of the drawing, a generator stator 1 is contained within a casing 2 which includes bearings 3 for supporting a rotor 4. An extension 2a of the casing 2 forms an enclosure for auxiliary components such as collector rings, etc. (not shown). The stator 1 is wound with armature bars 6 which may be of the liquid direct-cooled type and the cooling liquid is led to and discharged from armature bars 6 through manifolds 7 and liquid coolant pipes 8. The liquid is cooled and recirculated by external heat exchangers, filters, pumps, etc. (not shown). The operation of the stator winding and core cooling system is not material to an understanding of the present invention, but an example of such liquid-cooled stator winding construction is disclosed more particularly in the U.S. Patent to C. E. Kilbourne, 2,695,368, issued November 23, 1954, and assigned to the assignee of the present application.

The rotor 4 is comprised of spindle portions 4a and a body portion 4b, the latter being furnished with longitudinal slots 4c for carrying field windings 9. Field windings 9 produce an exciting magnetic field for the generator stator windings 6 and are comprised of slot portions 9a and end turns 9b.

Referring to FIG. 2, a partial section taken along line 2—2 of FIG. 1 shows slot portions 9a of the windings 9 to be disposed in a number of radially directed rotor slots 4c extending longitudinally along the rotor body 4b. The slot portions 9a of the windings are made up of a number of individual conductor strands 11 which are insulated from one another by strand insulation 12a and which are insulated from the rotor metal by heavy "slot armor" insulation 12b. The conductors 11 are retained against centrifugal force by dovetail slot wedges 13. It is to be noted that the edges of conductors 11 are formed with arcuate grooves 11a which together with slot armor 12b define longitudinal conduits 14 running the length of rotor body 4b. A more complete description of such a conductor may be had by referring to U.S. Patent No. 2,661,434, issued to C. E. Kilbourne on December 1, 1953, and assigned to the assignee of the present application. It may be noted in passing that there are several other suitable arrangements for forming longitudinal direct-cooling conduits adjacent the conductor metal, one of these being disclosed in U.S. Patent No. 2,664,512 issued to E. D. Huntley on December 29, 1953, and assigned to the assignee of the present application.

Surrounding the body portion 4b of the rotor and extending for a substantial distance beyond the ends thereof so as to encompass end turns 9b, is a relatively thin cylindrical member 15. Cylinder 15 is preferably formed from a single piece of metal although it could be made up from short cylindrical metal sections welded end to end and machined or alternately it could be of non-metallic construction. By "thin," it is meant that cylinder 15 is of such an order of thickness that it would not, by itself, serve to contain the forces imposed upon it by the liquid in the rotor or by the windings when the rotor is turning at the designed operating speed. It is contemplated that a thickness on the order of from one eighth to one quarter inch of carbon steel would be adequate to construct cylinder 15 in order to withstand the stresses imposed during assembly and in order to allow for welding additional members to its ends, as will later be described. Since cylinder 15 is relatively thin, it may be of magnetic material without diverting appreciable magnetic flux since it quickly becomes saturated. If, on the other hand, cylinder 15 were to be constructed of sufficient thickness to contain the liquid at operating speed, it would not be possible to permit cylinder 15 to be of magnetic material, as this would cause a substantial amount of flux to flow in the cylinder and greatly impair the efficiency of the generator. With the invention, as disclosed, the cylinder 15 is thin enough so that it does not adversely affect the flux pattern.

Surrounding cylinder 15 are a number of heavy rings 16 of high strength non-magnetic material. These are in the form of cylindrical sections and are not joined together but are disposed closely adjacent one another. The last ring 16a is comparable to the "retaining ring" of conventional rotors since it serves to retain the end windings 9b in place against centrifugal force. Here, however, it performs the additional function of the rings 16 in withstanding the liquid pressures around the end windings.

It is particularly to be noted that rings 16 are of non-magnetic alloy material, since the thickness of the metal required for the extreme stresses imposed would cause the use of a magnetic material to be prohibitive for the reasons stated above. Suitable non-magnetic materials having sufficient strength are austenitic steels or alloys of titanium. These non-magnetic alloys are notably difficult to weld or otherwise join. The employment of the thin inner "sealing" cylinder 15 allows rings 16 to be utilized without the necessity for joining them to one another.

Non-magnetic austenitic steel is one material which may be used for the construction of ring 16. For a 39-inch diameter rotor turning at 3600 r.p.m. and using transil oil as the liquid coolant, such a steel ring (calculated for a stress of 65,000 p.s.i.) would be approximately two inches thick. This thickness may be reduced by only partially flooding the rotor with liquid by introducing and withdrawing it from the spindle diameter, for example, rather than from the bore hole. Improved materials beyond those now available may allow higher working stress and hence a reduction in thickness. The thickness of rings 16 will increase rapidly as the rotor diameter is increased, due to the load created by the weight of the ring itself.

Titanium is particularly useful for the construction of rings 16 due to its low density, which is intermediate that of steel and aluminum. In addition to the forces imposed by the liquid in the rotor, rings 16 must resist the "hoop stresses" imposed by their own weight while rotating at a high speed. This self-imposed hoop stress is an appreciable portion of the total stress. Since the weight of titanium is considerably lower than that of steel, self-imposed stress derived from the retaining ring's own weight is reduced, and thus the total stress is reduced.

For titanium rings, a 41-inch diameter rotor using transil oil as the coolant (calculated for a stress of 50,000 p.s.i.), would also require a thickness of about two inches, thus indicating that the rotor diameter can be increased by using titanium rings.

Although the thickness of rings 16 is substantially greater than that of the cylinder 15, it will be realized that the ratio will vary according to the type of liquid and the windings used, rotor diameter, speed of the rotor. The selection of the proper thickness in a particular case can readily be made by one skilled in the art.

Cylindrical segments 17 having a diameter greater than that of spindle 4a are welded at their innermost ends to shoulders 4i at opposite ends of the rotor. Cylinders 17 extend for a distance approximately equal to the distance that cylinder 15 extends beyond the ends of the rotor body 4b. The outer ends of cylinders 15 and 17 are welded to the outer and inner peripheries of an annular member 18 so as to form a sealed compartment 19 of annular configuration at each end of the rotor, serving to contain the end turns 9b. It is to be noted that cylinder 17 is radially spaced from spindle 4a by clearance gap 20.

The last rings 16a on each end of the rotor extend past the ends of cylinder 15 and are shrunk onto a massive centering ring 21. The inner periphery of ring 21 is spaced from spindle portion 4a by a clearance gap 22.

Clearance gaps 20 and 22 serve to allow the spindle 4a to deflect under the weight of the rotor without imposing additional stress upon the cylinder 15 or the retaining rings 16.

A modified method of containing the liquid cooling the end windings may be seen by reference to FIG. 3 of the drawing. This construction permits the diameter of the highly stressed rings 16a at the end of the rotor to be reduced somewhat. In this modified construction, the cylindrical member 15 terminates short of the end of the rotor body 4b where the slot wedge 13 is grooved as shown at 13a. Groove 13a provides space for welding a special "stepped" cylindrical extension member 15a to member 15. Extension member 15a may be formed from a single piece but preferably is built up by welding a cylinder 15c to a two-diameter transition ring 15d as shown at 15e. Extension member 15a provides a reduced diameter of the leak-tight container over the end turns so that the last ring 16a may be reduced in diameter by an amount approximately equal to the thickness of two slot wedges 13. This reduction of diameter in member 16a is greatly beneficial in reducing the working stress.

Extension piece 15a is provided with a means for preventing axial movement of rings 16a through a bayonet-type annular key 15b. The details of key 15b are not material to the present invention, but a suitable construction is disclosed in co-pending application Serial No. 783,503, filed December 29, 1958, in the name of H. D. Taylor and assigned to the assignee of the present application.

A stationary coolant supply pipe 24, suitably sealed as by the weld shown at 24a, extends within and is spaced from the bore hole 4d so as to discharge coolant fluid in the vicinity of radial conduits 4e.

Likewise, at the other end of the generator a bore hole 4f in the shaft receives spent coolant from radial conduits 4g. The coolant is then discharged by additional axially spaced radial conduits 4h to a stationary shaft-mounted coolant collector 25 and thence to discharge conduit 26. An orifice 27 in the radial conduit 4h restricts the rate of flow to collector 25.

The details of circulating the coolant fluid to and from the end turn chambers 19 at either end of the rotor are not a part of the present invention. Details of a method for accomplishing this may be seen by reference to U.S. Patent No. 2,381,122 issued to C. J. Fechheimer on August 7, 1945, although other methods might be equally suitable. The coolant, after leaving discharge pipe 26, is cooled, filtered and recirculated back to intake pipe 24 by a number of external coolers, filters, pumps, etc. (not shown). This external equipment may, of course, be the same as that used to recirculate coolant through the stator coils 6 and the same coolant may be used for both purposes.

The operation of my improved liquid-cooled rotor will now be described. Coolant entering through pipe 24 is discharged from radial conduits 4e into chamber 19. The end turns contained in chamber 19 are completely immersed in the liquid and transfer heat to it through direct contact. From there the liquid flows along the longitudinal conduits 14 which are defined by the conductors 11 and receives additional heat generated by the slot portions 9b of the conductors in this manner. The liquid flows the length of rotor 4b, circulates about end turns 9b in chamber 19 at the other end of the rotor, and exits through radial conduits 4g, bore hole 4f, radial conduits 4h, etc., to discharge pipe 26.

It is to be noted that, since radial conduits 4e and 4g are of the same length and at the same radius from the axis of rotation, they cancel the effects of centrifugal force which would otherwise cause the liquid to flow. Hence the radial conduit 4h controls and the liquid will be caused to flow by a pressure which is determined by the speed of shaft rotation, the density of the liquid and the radial length of conduit 4h. Conduit 4h thus acts as a pump, and is useful in overcoming the internal fluid friction along the direct-cooling conduits 14. Due to the high speed of rotation, the length of conduit 4h would normally cause a flow in excess of that desired, therefore an orifice 27 may be used to restrict the flow from the rotor shaft.

Although the construction shown is suitable for conducting liquid to and from the rotor from the bore hole and spindle respectively, this practice is not material to the present invention and the depth of the liquid centrifuged to the outside of the rotor may be reduced by supplying and discharging the liquid from other points such as by supplying liquid at the rotor spindle diameter, or by metering liquid into the rotor so that the windings are barely covered by liquid.

In addition to the beneficial effect of centrifugal force in causing the fluid to flow, it has the adverse effect of tremendously increasing the "apparent density" of the fluid. The pressure resulting from this high "apparent density" causes the liquid to exert a uniform hydraulic force on cylinder 15. Cylinder 15 together with members 17, 18 forms an enclosure about the rotor body 4b which prevents any leakage of the liquid. But cylinder 15, being of relatively light construction, would not, in itself, be able to restrain the force of the fluid. Such restraint is exercised by the heavy rings 16. Rings 16 need not be sealed to one another so long as they are closely adjacent so as to support cylinder 15 along its entire length.

At the ends of the rotor, the rings 16a must support the end turns 9b in addition to the load which is carried by the other rings 16. Thus the stresses in these rings 16a will tend to be higher. The modification shown in FIG. 3 is beneficial in reducing these stresses by providing two-diameter cylindrical extension piece 15a for joining to cylindrical member 15 so as to permit the reduction in diameter of the rings 16a by an amount equal to the thickness of two slot wedges.

Thus the function of sealing the rotor against the escape of the liquid is assumed by cylinders 15, 15a while the function of supplying the required strength to withstand the force exerted by the liquid is assumed by rings 16, 16a. Rings 16a also must carry the end winding load.

The cylinder 15, being thin, will not appreciably affect the magnetic flux pattern. Therefore, it may be constructed of any material which is easy to machine and to join, without regard to its magnetic properties. On the other hand, the retaining rings 16 may be constructed of non-magnetic materials which are generally more difficult to work and to join, such as the austenitic steels or titanium. Since the rings 16 are non-magnetic, they may be as thick as necessary to withstand the load, without affecting the magnetic field provided by the windings 9 on the rotor 4.

It is particularly to be noted that the members defining end turn chamber 19 overhang the spindle portion 4a of the rotor and form a clearance therewith. The clearance spaces 20 and 22 between the cylinder 17 and retaining ring 21, respectively, allow the rotor shaft 4a to flex without adding to the stresses already borne by rings 16 and without disturbing the sealed compartment 19 containing the liquid.

The liquids suitable for use should be dielectric, such as transil oil, "Pyranol," or water of high purity. A disclosure of a water-cooling purification system which would be suitable may be seen in U.S. Patent 2,999,951 issued to Edward J. Flynn, on September 12, 1961, and assigned to the assignee of the present application. In addition, the liquid selected should be of a low density, if possible, in order to minimize the force on retaining rings 16, and should, of course, have good heat transfer capabilities and high specific heat. Since transil oil has a specific gravity only .85 that of water, the liquid stresses may be greatly reduced by using it as the liquid coolant.

While there has been described what is at present considered to be the preferred embodiment of my invention, it will be understood that various modifications may be made therein, and it is intended to cover in the appended claims all such modifications which fall within the scope of my invention.

What I claim as new and desire to secure by Letters Patent of the United States is:

1. A rotor for a dynamoelectric machine comprising a cylindrical rotor body defining circumferentially spaced longitudinal slots, electrical conductor means disposed in said slots and defining cooling ducts for transporting liquid in direct contact with said conductor means, a thin cylindrical member tightly encompassing the outer periphery of the rotor body and sealed thereto at opposite ends thereof to define a liquid-tight enclosure containing the conductor means, means to introduce liquid coolant to said enclosure to cool the conductor means, and a plurality of relatively thick discrete rings of non-magnetic material tightly encompassing the cylindrical member along the entire length thereof and being of a thickness substantially greater than that of the cylindrical member, whereby the rings will support the cylindrical member against the centrifugal forces exerted on the cylindrical member by the liquid coolant.

2. A rotor for a dynamoelectric machine comprising a cylindrical rotor body defining circumferentially spaced longitudinal slots, insulated electrical conductors disposed in said slots and defining longitudinal cooling ducts which are open at either end of the rotor body for transporting liquid in direct contact with the conductors from one end of the rotor to the other, a relatively thin cylindrical member tightly encompassing the outer periphery of the rotor body and extending beyond the ends thereof, annular means connected between the ends of the extensions and the rotor to define first and second liquid-tight annular compartments as opposite ends of the rotor, means to supply liquid coolant to said first compartment, means to discharge spent coolant from said second compartment, whereby the liquid coolant will flow from the first compartment to the second compartment through said longitudinal cooling ducts, and a plurality of discrete rings of non-magnetic material tightly encompassing the cylindrical member along the entire length thereof and being of a thickness substantially greater than that of the cylindrical member, whereby said rings will support the cylindrical member to contain the force exerted on the cylindrical member by the liquid.

3. A rotor for a dynamoelectric machine comprising a central body portion and first and second spindle portions at opposite ends thereof, and defining first and second shoulders disposed between the spindle and body portions having a diameter intermediate the spindle and body diameters, said central body portion defining a plurality of circumferentially spaced longitudinal slots, a plurality of electrical conductors disposed in each of said slots and extending beyond the rotor body to form end turns for connecting the slot portions of the windings, said conductors defining longitudinal cooling ducts open at either end of the central body portion of the rotor, wedge means retaining the windings in said longitudinal slots, a relatively thin outer cylindrical member tightly encompassing the central body portion of the rotor and extending at each end thereof beyond the conductor end turns, first and second inner cylinders secured at one end thereof to said first and second rotor shoulders respectively and defining radial clearances with the spindle portion, first and second annular means sealingly connecting the free ends of the outer cylindrical member and the ends of the inner cylindrical members to define first and second annular liquid-tight compartments containing the end turns at opposite ends of the rotor, means to circulate liquid coolant from the first compartment to the second compartment, whereby the coolant will flow through said coolant ducts to cool the conductors, and a plurality of cylindrical rings of non-magnetic material and being of a thickness substantially greater than that of the outer cylindrical member tightly encompassing the outer cylindrical member and disposed end to end so as to support the cylindrical member over its entire length, whereby said rings will support the outer cylindrical member against internal pressure caused by centrifugal force.

4. A rotor for a dynamoelectric machine comprising a cylindrical rotor body defining circumferentially spaced slots, a winding having slot-lying portions disposed in said slots and having connecting end turn portions beyond the ends of the slots, said slot-lying portions defining longitudinal cooling ducts for transporting a liquid in heat exchange relationship with the winding from one end of the rotor body to the other, means retaining the winding in the slots, a relatively thin cylindrical member encompassing the rotor body and said winding retaining means, and a plurality of discrete non-magnetic rings surrounding said cylindrical member, said rings being of substantially greater thickness than the cylindrical member and abutting one another end to end over the length of the cylindrical member, whereby the cylindrical member prevents leakage of liquid from the slots past the retaining means while the rings support the cylindrical member against internal pressure.

5. A rotor for a dynamoelectric machine comprising a cylindrical rotor body defining circumferentially spaced slots, a winding having slot-lying portions disposed in said slots and having connecting end turn portions beyond the ends of the slots, said slot-lying portions defining longitudinal cooling ducts for transporting a liquid in heat exchange relationship with the winding from one end of the rotor body to the other, means retaining the winding in the slots, a relatively thin cylindrical member disposed about the rotor body and the winding retaining means and having one end terminating near the end of the rotor body, a two-diameter extension member of relatively thin wall thickness having a first diameter substantially that of the rotor body cylindrical member and joined thereto and a second lesser diameter substantially that of the outer portions of the end windings and encompassing same, a plurality of discrete non-magnetic rings of a wall thickness substantially greater than either the cylindrical member or the extension member tightly encompassing said members to support them against internal pressure caused by centrifugal force.

6. A rotor for a dynamoelectric machine comprising a cylindrical rotor body defining circumferentially spaced slots, a winding having slot-lying portions disposed in said slots and having connecting end turn portions beyond the ends of the slots, said slot-lying portions defining longitudinal cooling slots for transporting a liquid in heat exchange relationship with the winding from one end of the rotor body to the other, a plurality of slot wedges retaining the winding in the slots, a first thin cylindrical member tightly enclosing said rotor body in said slot wedges and having ends terminating near the rotor body ends, a pair of second thin cylindrical members each having a first axially extending enlarged cylindrical portion joined to the ends of the first cylindrical member and having a second axially extending cylindrical portion of lesser diameter than the first portion encompassing the winding end turns, means sealingly connecting the ends of said second portions to the rotor to define first and second annular liquid-tight compartments containing the end turns at opposite ends of the rotor, means supplying liquid coolant to the first compartment, means receiving spent coolant from the second compartment, whereby the coolant will flow through said coolant ducts to cool the conductors, and a plurality of discrete non-magnetic cylindrical rings of a thickness substantially greater than that of the first and second cylindrical members tightly encompassing said members and disposed end to end so as to support said cylindrical members over their length against internal pressure caused by centrifugal force.

References Cited in the file of this patent

UNITED STATES PATENTS

| 1,376,720 | Rudenberg | May 3, 1921 |
| 2,527,878 | Fechheimer | Oct. 31, 1950 |

FOREIGN PATENTS

| 508,737 | Italy | June 11, 1955 |
| 513,172 | France | Oct. 28, 1920 |
| 836,060 | Germany | Apr. 7, 1952 |